(12) United States Patent
Gaskins

(10) Patent No.: US 7,290,156 B2
(45) Date of Patent: *Oct. 30, 2007

(54) FREQUENCY-VOLTAGE MECHANISM FOR MICROPROCESSOR POWER MANAGEMENT

(75) Inventor: Darius D. Gaskins, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 483 days.

This patent is subject to a terminal disclaimer.

(21) Appl. No.: 10/816,004

(22) Filed: Apr. 1, 2004

(65) Prior Publication Data

US 2005/0138444 A1 Jun. 23, 2005

Related U.S. Application Data

(60) Provisional application No. 60/530,323, filed on Dec. 17, 2003.

(51) Int. Cl.
G06F 1/32 (2006.01)
(52) U.S. Cl. ...................................... 713/322; 713/320
(58) Field of Classification Search ...................... None
See application file for complete search history.

(56) References Cited

U.S. PATENT DOCUMENTS

| | | |
|---|---|---|
| 5,544,138 A | 8/1996 | Bajorek et al. |
| 5,557,557 A | 9/1996 | Frantz et al. |
| 5,719,800 A | 2/1998 | Mittal et al. |
| 5,815,724 A | 9/1998 | Mates |
| 5,926,641 A | 7/1999 | Shay |
| 5,996,083 A | 11/1999 | Gupta et al. |

(Continued)

FOREIGN PATENT DOCUMENTS

CN 1332398 A 1/2002

(Continued)

OTHER PUBLICATIONS

Rotem et al. "Analysis of Thermal Monitor Features of the Intel Pentium M Processor. " Downloaded from http://www.cs.virginia.edu/~skadron/tacs/men.pdf on Mar. 7, 2007.

(Continued)

Primary Examiner—Rehana Perveen
Assistant Examiner—Anand B. Patel
(74) Attorney, Agent, or Firm—Gary R. Stanford; Richard K. Huffman; James W. Huffman

(57) ABSTRACT

A frequency-voltage mechanism for power management including first and second PLLs, select logic, control logic, and voltage control logic. The first PLL generates a first source clock signal at a first frequency based on a bus clock signal. The second PLL generates a second source clock signal at a second frequency based on a first frequency control signal and the bus clock signal. The select logic selects between the first and second source clock signals to provide a core clock signal based on a select signal. The clock control logic detects power conditions via at least one power sense signal, provides the first frequency control signal according to power conditions, and provides the select signal. The voltage control logic adjusts the operating voltage commensurate with frequency of the core clock signal. Power consumption is dynamically adjusted without undue delay while providing significant power efficiency benefits.

16 Claims, 5 Drawing Sheets

U.S. PATENT DOCUMENTS

| | | | |
|---|---|---|---|
| 6,172,611 | B1 | 1/2001 | Hussain et al. |
| 6,233,691 | B1 | 5/2001 | Atkinson |
| 6,259,293 | B1 * | 7/2001 | Hayase et al. .............. 327/276 |
| 6,384,733 | B1 | 5/2002 | Seesemann |
| 6,438,697 | B2 | 8/2002 | Atkinson |
| 6,448,834 | B2 * | 9/2002 | Takaki ........................ 327/291 |
| 6,487,668 | B2 | 11/2002 | Thomas et al. |
| 6,609,211 | B2 | 8/2003 | Atkinson |
| 6,671,175 | B1 | 12/2003 | Chen |
| 6,836,849 | B2 * | 12/2004 | Brock et al. ................ 713/310 |
| 7,006,943 | B1 | 2/2006 | Mitchell et al. |
| 7,017,061 | B2 | 3/2006 | Lippert et al. |
| 7,019,577 | B2 * | 3/2006 | Agrawal et al. ............ 327/296 |
| 7,069,463 | B2 | 6/2006 | Oh |
| 2005/0138444 | A1 | 6/2005 | Gaskins et al. |

FOREIGN PATENT DOCUMENTS

| | | |
|---|---|---|
| CN | 1438533 | 8/2003 |
| JP | 07209091 A | 8/1995 |
| TW | 0548534 B | 8/2003 |
| TW | 573760 | 1/2004 |

OTHER PUBLICATIONS

Intel 64 and IA-32 Architectures Software Developer's Manual. vol. 3A: System Programming Guide, Part 1, Nov. 2006. pp. 13-1, and 13-5 to 13-15.

Intel Pentium M Processor with 2-MB L2 Cache and 533-MHz Front Side Bus. Datasheet. Jul. 2005. pp. 14 and 62-64. Reference No. 305262-002.

Wireless Intel SpeedStep Power Manager. "Optimizing power consumption for the Intel PXA27x processor family. " Intel. 2004. pp. 1-16.

"Enhanced Intel SpeedStep Technology for the Intel Pentium M Processor. " Intel. Mar. 2004. pp. 1-12.

* cited by examiner

FREQUENCY-VOLTAGE MECHANISM FOR MICROPROCESSOR POWER MANAGEMENT

CROSS-REFERENCE TO RELATED APPLICATIONS

This application claims the benefit of U.S. Provisional Application Ser. No. 60/530323, filed on Dec. 17, 2003, which is herein incorporated by reference for all intents and purposes.

This application is related to the following co-pending U.S. Patent Application, which is filed on the same day as this application, which has a common assignee and at least one common inventor, and which is herein incorporated by reference in its entirety for all intents and purposes:

| SER. NO. | FILING DATE | TITLE |
| --- | --- | --- |
| 10/816020 (CNTR.2207) | Apr. 1, 2004 | INSTANTANEOUS FREQUENCY-BASED MICROPROCESSOR POWER MANAGEMENT |

BACKGROUND OF THE INVENTION

1. Field of the Invention

The present invention relates to microprocessor power management, and more particularly to providing means for dynamically adjusting the power consumed by a microprocessor in a manner that does not incur undue delays and that provides power efficiency benefits over stand-alone frequency of voltage modulation techniques.

2. Description of the Related Art

Power consumption management is an important issue for several types of computing systems, including portable devices, laptop computers and the so-called "green" computers. Battery life, for example, is a significant issue for most laptop computer users. The microprocessor consumes a significant amount of power, so that it is often the target of power reduction techniques. The challenge for microprocessor designers is to provide a means for changing the power state of the microprocessor in a smooth and relatively seamless fashion, and to complete such transition as quickly as possible. Several different techniques for modifying the power consumption of a microprocessor are known, including, for example, dynamically changing the frequency of the microprocessor's core clock signal. The power consumption of a microprocessor is proportional to the frequency of its core clock signal.

FIG. 1 is a simplified block diagram of a conventional power management system 100, which illustrates how frequency-based power management is accomplished in existing microprocessors. A SENSE interface 101 (e.g., sense bus or the like) provides one or more power sense signals to power management logic 103. The power management logic 103 determines a power state at which the microprocessor should be executing based on the immediate and/or previous states of the sense signals of the SENSE interface 101. Exemplary sense signals on the sense interface 101 include, for example, values of machine specific registers written by software, such as the operating system (OS) software or the like, temperature transducers (not shown), remaining power signals, etc. To execute at a particular power state, the power management logic 103 sets the value of a core ratio (CORERATIO) bus to a phase lock loop (PLL) 105. The PLL 105 generates a CORE CLOCK signal as a function of the frequency of a BUS CLOCK signal and the value of the CORERATIO bus from the power management logic 103, where the CORE CLOCK signal is fed back to the PLL 105. A core clock ratio value of three (3), for example, would direct the PLL 105 to generate the CORE CLOCK signal that is three times the frequency of the BUS CLOCK signal.

As understood by those skilled in the art, the PLL 105 generally multiplies the frequency of the external BUS CLOCK signal and generates the CORE CLOCK signal for internal use. For example, a 500 megahertz (MHz) BUS CLOCK signal is multiplied by eight (e.g., CORERATIO=8) to yield a 4.0 gigahertz (GHz) machine during full power conditions. The PLL 105 keeps the CORE CLOCK signal in phase with the BUS CLOCK signal. The value provided via the CORERATIO bus indicates a reduced frequency of operation for reduced power levels, such as a 25% power level (CORERATIO=2), a 50% level (CORERATIO=4), a 75% level (CORERATIO=6), etc.

The conventional power management system 100, which provides for dynamically changing the power state of a microprocessor, is disadvantageous because the PLL 105 incurs a significant delay to change from one frequency to the next. The delay is often substantial, such as on the order of hundreds of clock cycles. The computer system may be temporarily suspended during each PLL frequency change delay. For example, if an application is running on the microprocessor that is performing a relatively simple function, such as a DVD decode or the like, it is very likely that power can be conserved by running at a reduced frequency, such as half-frequency. The power management logic 103 detects power sense signals indicating a reduced power state and directs the PLL 105 via the CORERATIO bus to ramp down in frequency. A commensurate delay occurs while the PLL 105 is ramping down. In addition, other tasks may be invoked by the OS during or shortly after that time, which require immediate changeover back to full operating frequency. Such events cause additional delays and performance degradation until the PLL 105 ramps back up to the full operating frequency. These frequency change delays are often detected by the user, in that applications may appear to be locked up from time to time. Existing frequency modulation techniques, therefore, disadvantageously affect overall performance.

SUMMARY OF THE INVENTION

A frequency-voltage mechanism for power management according to an embodiment of the present invention includes first and second PLLs, select logic, control logic, and voltage control logic. The first PLL generates a first source clock signal at a first frequency based on a bus clock signal. The second PLL generates a second source clock signal at a second frequency based on a first frequency control signal and the bus clock signal. The second PLL generates a first frequency lock signal when the second source clock signal achieves a reduced frequency indicated by the first control signal. The select logic selects between the first and second source clock signals to provide a core clock signal based on a select signal. The clock control logic detects power conditions via at least one power sense signal, provides the first frequency control signal according to the power conditions, and provides the select signal. The clock control logic controls the select signal to switch the core clock signal from the first PLL to the second PLL in response to the first frequency lock signal. The voltage control logic adjusts the operating voltage commensurate with frequency of the core clock signal.

It is appreciated that the frequency-voltage mechanism provides means for dynamically adjusting the power consumed in a manner that does not incur undue delays and that provides power efficiency benefits over stand-alone frequency or voltage modulation techniques. The clock control logic selects one source clock signal while ramping the other, and then switches when the second source clock signal achieves a desired frequency. Switching is effectively instantaneous, such as, for example, within one cycle of the bus clock signal. The first PLL may be implemented as a fixed-frequency device (e.g., at a maximum frequency level) or as a programmable device similar to the second PLL. For example, the first PLL may generate the first clock source signal based on a second frequency control signal and provide a second lock signal indicative thereof. In this case, the clock control logic provides the second frequency control signal and receives the second lock signal.

In embodiments where the second PLL generates a first frequency lock signal when the second source clock signal achieves a reduced frequency indicated by the first frequency control signal, and where the clock control logic switches the core clock signal from the first PLL to the second PLL in response to the first frequency lock signal, the voltage control logic reduces the operating voltage after the core clock signal is switched. The voltage control logic increases the operating voltage in response to increase power conditions, and then clock control logic switches to the first PLL after the operating voltage is increased. If the first PLL is programmable, then the clock control logic further waits for the second lock signal before switching. In one embodiment, the clock control logic and the voltage control logic cooperate to increase the operating voltage prior to increasing frequency of the core clock signal and to decrease the operating voltage after decreasing frequency of the core clock signal.

A power supply may be provided that adjusts the operating voltage based on a voltage step signal from the voltage control logic. The power supply provides a voltage lock signal indicative thereof to the clock control logic. Thus, the clock control logic increases frequency of the core clock signal only after the voltage has been increased to the proper level.

A microprocessor according to an embodiment of the present invention includes a power condition sense interface, an operating voltage interface, first and second PLLs, a clock controller, select logic, and a voltage controller. The power condition sense interface receives at least one power sense signal indicative of power conditions. The first PLL generates a first source signal at a frequency based on a bus clock signal and a first core ratio bus value and provides a corresponding first lock signal. The second PLL generates a second source signal at a frequency based on the bus clock signal. The clock controller provides a select signal for switching between the first and second PLLs, provides the first core ratio bus value to control frequency of the first source signal, and receives the first lock signal. The select logic selects between the first and second PLLs based on the select signal to provide a core clock signal. The voltage controller adjusts operating voltage commensurate with frequency of the core clock signal.

In various embodiments, the second PLL may be fixed or programmable. The clock controller and the voltage controller cooperate to decrease operating voltage after decreasing frequency of the core clock signal and to increase operating voltage before increasing frequency of the core clock signal.

A method of frequency-voltage control for microprocessor power management includes generating a first source clock at a first frequency based on a bus clock signal and a first ratio bus value, generating a second source clock at a second frequency based on the bus clock signal and a second ratio bus value, sensing power conditions, switching core operating frequency between the first and second source clock signals based on sensed power conditions, and selecting operating voltage commensurate with the core operating frequency.

The method may further include initially selecting the first source clock signal, providing the second ratio bus value based on reduced power conditions to indicate a reduced frequency, ramping the second source clock signal to the reduced frequency in response to the second ratio bus value, detecting a first lock indication when the second source clock signal achieves the reduced frequency, switching to the second source clock signal when the lock indication is detected, and reducing operating voltage commensurate with the reduced frequency after said switching. The method may include switching within one bus clock cycle. The method may include sensing increased power conditions, increasing operating voltage commensurate with the sensed power conditions, and switching to the first source clock signal. In this latter case, prior to switching to the first source clock signal, the method may include determining an increased power level appropriate for the increased power conditions, providing the first ratio signal indicative of an increased frequency based on the increased power level, ramping the first source clock signal to the increased frequency, increasing operating voltage commensurate with the increased frequency, and detecting a second lock indication when the first source clock signal achieves the increased frequency.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need for changing microprocessor clock speed in a quick and seamless manner while also changing the voltage for purposes of power management. They have therefore developed an apparatus and method for frequency-voltage mechanism for microprocessor power management, as will be further described below with respect to FIGS. 2–5.

Figure 1:
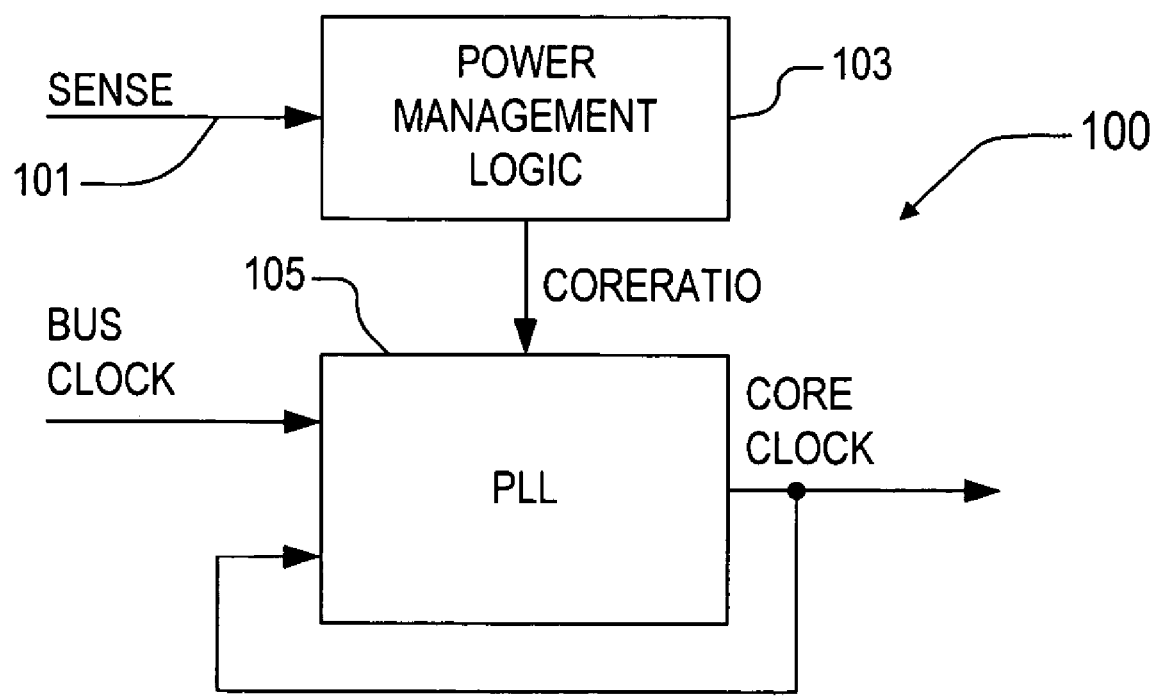
FIG. 1 is a simplified block diagram of a conventional power management system, which illustrates how frequency-based power management is accomplished in existing microprocessors.
Figure 2:
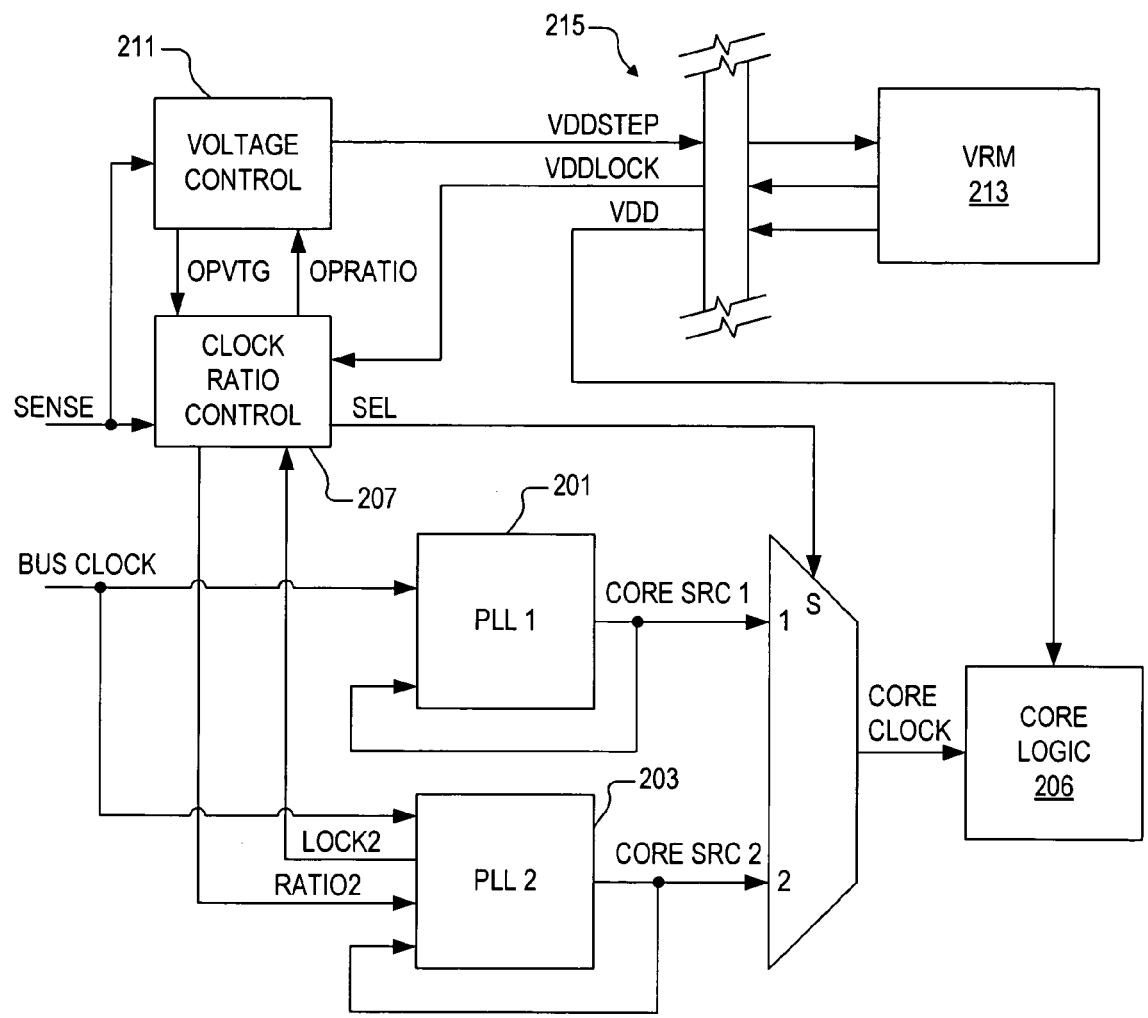
FIG. 2 is a block diagram of a frequency-voltage power management system implemented according to an embodiment of the present invention.
Figure 4:
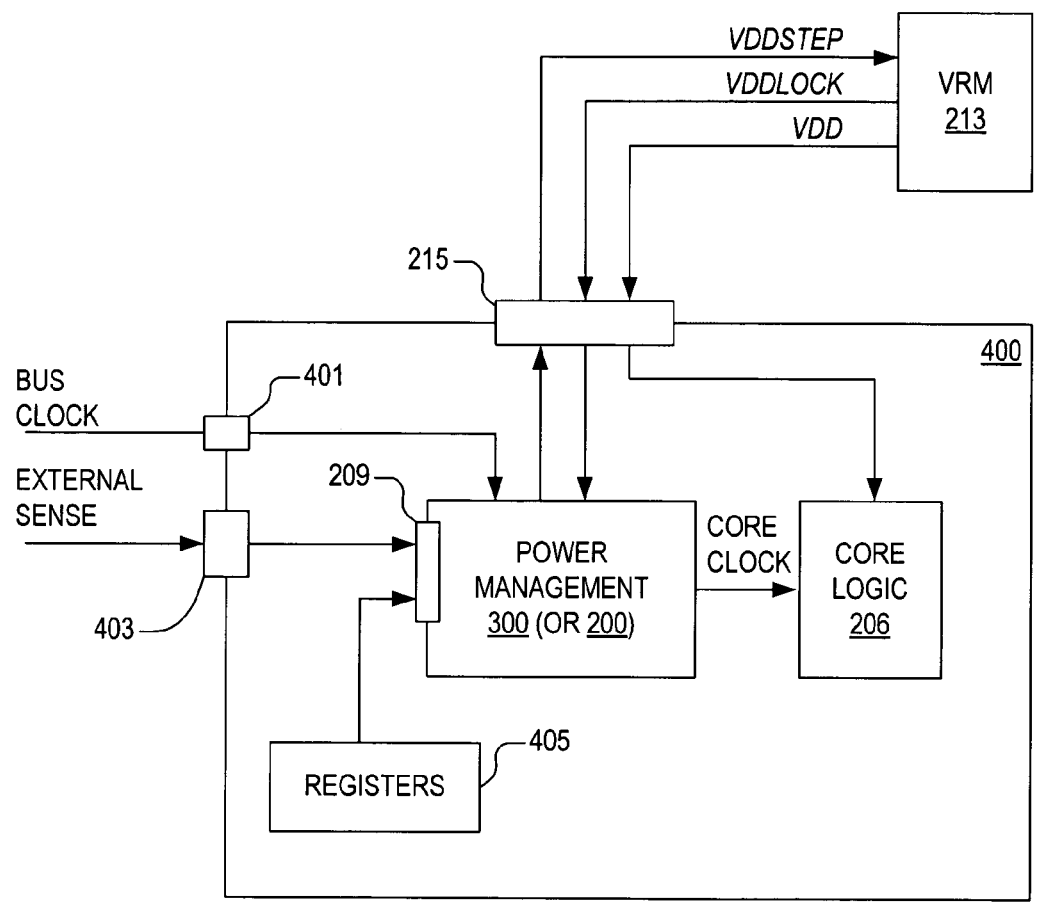
FIG. 4 is a simplified block diagram of a microprocessor including either one of the frequency-voltage power management systems of FIGS. 2 and 3.

FIG. 2 is a block diagram of a frequency-voltage power management system 200 implemented according to an exemplary embodiment of the present invention. The power management system 200 includes two PLLs 201 and 203 operating in parallel (shown as PLL 1 and PLL 2), each receiving an external BUS CLOCK signal, such as generated on the motherboard of a computer system (not shown). The PLL 201 outputs a first core source clock signal CORE SRC 1 and the PLL 203 outputs a second core source clock signal CORE SRC 2, which signals are provided to respective inputs (1 and 2) of a multiplexer (MUX) 205. The CORE SRC 1 signal is fed back to an input of the PLL 201 in accordance with PLL operation, and the PLL 201 maintains the CORE SRC 1 signal synchronized with the BUS CLOCK signal. In a similar manner, the CORE SRC 2 signal is fed back to an input of the PLL 203, which maintains the CORE SRC 2 signal synchronized with the BUS CLOCK signal. The output of the MUX 205 provides a CORE CLOCK signal to core logic 206, where the CORE CLOCK signal is a selected one of the CORE SRC 1 and 2 signals based on a select input (S) receiving a select signal SEL. The selected CORE CLOCK signal is used by the core logic 206 of the microprocessor 400 (FIG. 4).

For the system 200, the PLL 201 is fixed and runs continuously and multiplies the frequency of the external BUS CLOCK signal by a predetermined multiple to enable full operating frequency and full power mode of the microprocessor 400. The PLL 203 is programmable to produce alternative and usually reduced frequencies that fall within a frequency range that is desirable for power management purposes. Clock ratio control logic (or controller) 207 senses power conditions of the system via power sense signals on a SENSE interface 209 (e.g., bus) in a similar manner as described above for the power management logic 103. The clock ratio control logic 207 directs the PLL 203 via a core ratio bus value RATIO2 to ramp up or down to a specified frequency multiple that achieves power management goals for the core logic 206 as indicated by the power sense signals. In the particular embodiment illustrated, the RATIO2 bus value is a multiple value relative to the BUS CLOCK signal, although other formats are contemplated and is generally considered a frequency control signal. The PLL 203 changes frequency in response to the RATIO2 bus value, and indicates to the clock ratio control logic 207 that it is operating at the specified frequency by asserting a signal LOCK2. At this point, the clock ratio control logic 207 optionally directs the MUX 205 to select CORE SRC 2 as the CORE CLOCK signal via the SEL signal if the power conditions for the new frequency level are still valid. The transition from CORE SRC 1 to CORE SRC 2 is "instantaneous", such as within a single cycle of the BUS CLOCK signal. In an alternative embodiment, the clock ratio control logic 207 delays for a programmable number of clock cycles after setting the value of RATIO2 and then directs the MUX 205 to select CORE SRC 2 as the CORE CLOCK signal. In this alternative embodiment, signal LOCK2 is not employed. The number of clock cycles is programmable via writing to a machine specific register (not shown) or via blowing fuses (not shown) on the part. Alternatively, the clock ratio control logic 207 comprises logic (not shown) within that delays a fixed number of clock cycles before switching to CORE SRC 2.

It is noted that the power management system 200 operates using CORE SRC 1 as the selected CORE CLOCK while the PLL 203 is changing until locked at the new target frequency, at which time the CORE CLOCK signal is switched in a quick and seamless manner. Thus, the transition from one power state to the next is instantaneous and significantly faster than has been heretofore provided. Users benefit from power adjustments without incurring undue delay or performance degradation.

If the computing environment changes, as indicated by the SENSE interface 209, such that full operating frequency is once again required during the time that the PLL 203 is ramping up or down, then the clock ratio control logic 207 does not switch the MUX 205 from CORE SRC 1 to CORE SRC 2. In this manner, the indeterminate period of the PLL 203 during changeover does not cause degradation in performance even if power needs change again. Furthermore, after switchover to CORE SRC 2, if the computing environment changes such that full power is needed or if any other power level is indicated, then the clock ratio control logic 207 immediately switches back to select the CORE SRC 1 from the PLL 201 as the CORE CLOCK signal. Again, the switchover is instantaneous and seamless, such as within one cycle of BUS CLOCK. After switchover back to the CORE SRC 1, the clock ratio control logic 207 re-programs the PLL 203 to any new desired frequency level.

In the embodiment illustrated, the PLL 201 remains locked for full power operation so that switchover back to CORE SRC 1 can occur at any time and multiple times in a relatively short period. Suppose, for example, that power conditions indicate a 50% power level so that the PLL 203 ramps CORE SRC 2 to a 50% frequency level and the CORE CLOCK is switched to CORE SRC 2, and then a 75% level is suddenly needed. In this case, the clock ratio control logic 207 switches immediately back to select CORE SRC 1 and then sets the value of the RATIO2 bus to indicate a 75% level to the PLL 203. Even though more power is temporarily consumed than necessary, system delays do not occur. When the PLL 203 asserts the LOCK2 signal indicating that the CORE SRC 2 clock signal is locked onto the 75% frequency level, if the power conditions still indicate that the 75% power level is desired, then the CORE CLOCK signal is immediately switched to CORE SRC 2.

In addition to changing the frequency, present day microprocessors also include provisions for modulating the voltage that drives core logic. One skilled in the art will appreciate that core logic which is operated at a lower frequency can also be operated at a lower voltage without incurring performance penalties. For instance, current CMOS fabrication processes require, say, a 1.5-volt core voltage to drive a part at 1 GHz. But when the operating frequency is decreased to 500 MHz, a 1.5-volt core voltage is not required but instead only 1.1 volt core voltages are required. Hence, further power savings are available by combining frequency and voltage modulation.

The sense interface 209 is further coupled to a voltage controller or voltage control logic 211, which is configured to control modulation of the operating voltage for the core logic 206 within the microprocessor 400 to ensure that power consumption of the microprocessor 400 is minimized for a given operating frequency. The clock ratio control logic 207 provides the current operating ratio to the voltage control logic 211 via one or more signals OPRATIO. The voltage control logic 211 provides an operating voltage status signal OPVTG to the clock ratio control logic 207. The voltage control logic 211 indicates via a signal VDDSTEP a desired operating voltage to an external power supply, shown as VRM 213, externally coupled to the microprocessor 400 via a voltage interface 215. The VRM 213 provides the desired operating voltage to the microprocessor 400 via power bus VDD coupled through the voltage interface 215, where VDD is internally provided to the core logic 206. When the VRM 213 has established VDD to the desired operating voltage, it asserts a signal VDDLOCK, which signal is internally routed from the voltage interface 215 to the clock ratio control logic 207.

During the time that the PLL 203 is ramping up or down, or if the computing environment otherwise changes such that full operating ratio is required, as indicated over the SENSE interface 209, then the clock ratio control logic 207 directs the MUX 205 via the SEL signal to continue using CORE SRC 1 as the CORE CLOCK signal. If the computing environment changes following switchover to CORE SRC 2 and a lower voltage, then the voltage control logic 211 asserts the VDDSTEP signal to increase the operating voltage VDD to a voltage commensurate with a full operating ratio. The VRM 215 receives the VDDSTEP signal, increases the VDD signal accordingly, and asserts the VDDLOCK signal when the VDD signal is stable. The clock ratio control logic 207 detects via the OPVTG signal the command to increase operating voltage. The clock ratio control logic 207 detects the VDDLOCK signal and switches the SEL signal to select the PLL 201 and the CORE SRC 1 signal as the CORE CLOCK signal. In an alternative embodiment, the clock ratio control logic 207 delays for a programmable number of clock cycles after receiving OPVTG from the voltage control logic 211 and then directs the MUX 205 to select CORE SRC 1 as the CORE CLOCK signal. In this alternative embodiment, signal VDDLOCK is not employed. The number of clock cycles is programmable via writing to a machine specific register (not shown) or via blowing fuses (not shown) on the part. Alternatively, the clock ratio control logic 207 comprises logic (not shown) within that delays a fixed number of clock cycles before switching to CORE SRC 1.

The voltage control logic 211 and the clock ratio control logic 207 cooperate to ensure that the operating voltage (i.e., VDD) is sufficient to support the existing frequency and the new frequency of the CORE CLOCK signal. Thus, the operating voltage is decreased after the frequency of the CORE CLOCK signal is decreased, and the operating voltage is increased before the frequency of the CORE CLOCK signal is increased. In this manner, the frequency of the CORE CLOCK signal is not increased beyond the appropriate level for the operating voltage.

The present invention also contemplates embodiments where both frequency and voltage (if required) are changed following changes of the computing environment as indicated over the SENSE interface 209. According to these embodiments, if the SENSE interface 209 indicates that frequency is to be lowered, the clock ratio control logic directs a decrease in the frequency of the CORE CLOCK signal along with a decrease in operating voltage, and then waits for assertion of LOCKx and VDDLOCK (or delays a number of clock cycles), and then switches to the new CORE SRC x for the CORE CLOCK. Only after the change is made, do these embodiments detect new changes over the SENSE interface 209. Consequently, if the computing environment changes during the time that a PLL 201, 203 is ramping up or down, or during the time that the VRM 213 is ramping up or down, the change will not be detected over the SENSE interface 209 until after the CORE CLOCK (and VDD, if required) is switched.

Figure 3:
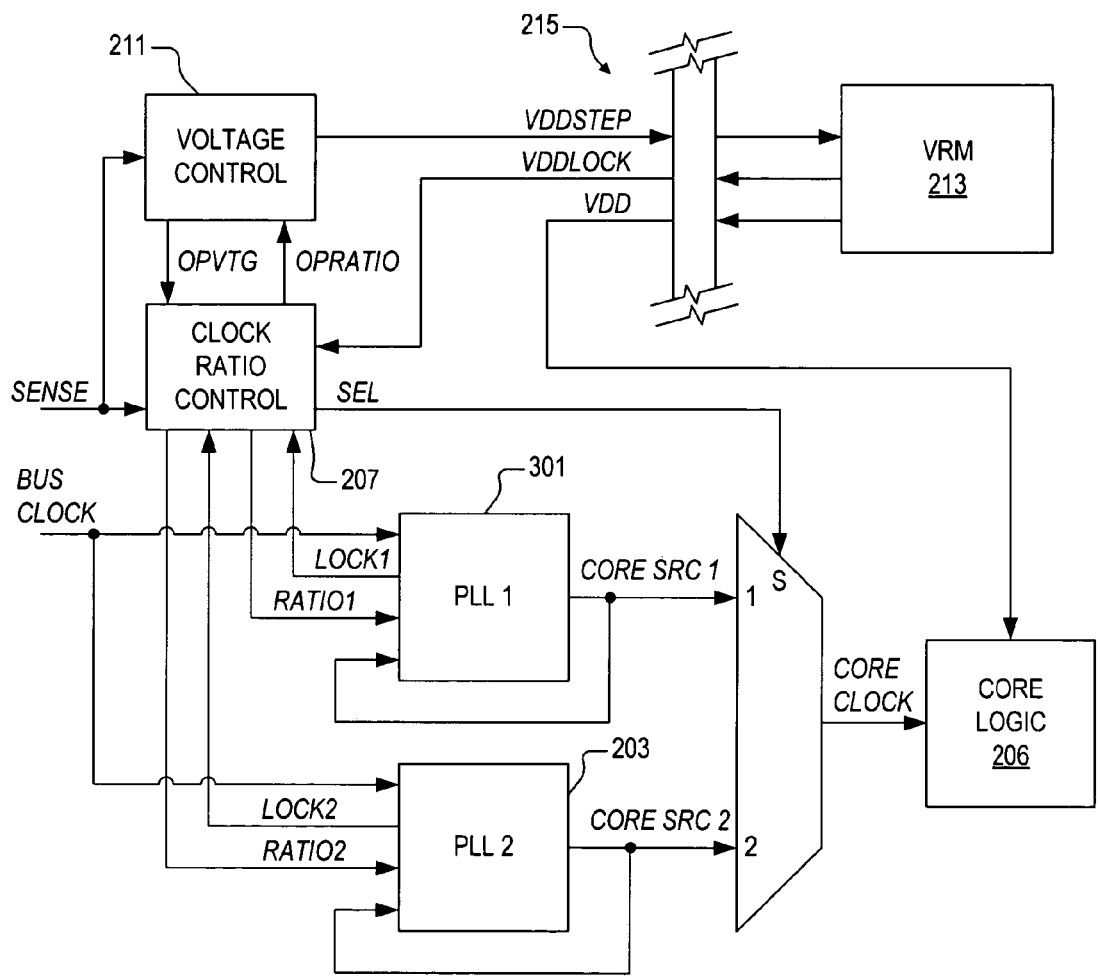
FIG. 3 is a block diagram of another frequency-voltage power management system implemented according to an alternative embodiment of the present invention.

FIG. 3 is a block diagram of another frequency-voltage power management system 300 implemented according to an alternative embodiment of the present invention. The system 300 is similar to the system 200 in which like components assume identical reference numbers. For the system 300, the PLL 201 is replaced by a programmable PLL 301, which is similar in configuration and function to the PLL 203. The clock ratio control logic 207 provides another ratio bus RATIO1 to the PLL 301 to program the frequency of CORE SRC 1 in a similar manner as previously described for PLL 203. The PLL 301 provides a lock signal LOCK1 back to the clock ratio control logic 207 when the CORE SRC 1 signal is locked onto the frequency indicated by the value of the RATIO1 bus. The clock ratio control logic 297 includes provisions to monitor the VDDLOCK and LOCK1 signals to ensure that both operating voltage and the PLL 301 are locked prior to switching over to CORE SRC 1 as the CORE CLOCK signal. The system 300 provides the added flexibility in that the CORE SRC 1 signal is not fixed but instead may be programmed to any frequency other than the maximum operating frequency. Switching operation is similar in that the voltage control logic 211 and the clock ratio control logic 207 cooperate to ensure that the operating voltage (i.e., VDD) is sufficient to support the existing frequency and the new frequency of the CORE CLOCK signal as previously described.

In addition to the above embodiment, as described above with reference to FIG. 2, the present invention envisions embodiments where the clock ratio control logic 207 waits for a fixed or programmable number of clock cycles before switching in lieu of employing the lock signals LOCK1, LOCK2, VDDLOCK. Moreover, an embodiment is comprehended where the CORE CLOCK (and operating voltage, if required) is switched following detection of a computing environment change via the SENSE interface 209 before again monitoring the SENSE interface 209 for subsequent change to the computing environment.

FIG. 4 is a simplified block diagram of the microprocessor 400 including the frequency-voltage power management system 200 or 300. One or more pins 401 of the microprocessor 400 receive the BUS CLOCK signal from an external source, such as generated on the motherboard of a computer system, where the BUS CLOCK signal is provided to the power management system 200/300 within the microprocessor 400. The PLLs 201 or 301 and 203 within the power management system 200/300 keep the CORE CLOCK signal in phase with the BUS CLOCK signal. Another external interface 403 including one or more pins receives external sense signals which are provided to the power management system 200/300 via the sense interface 209. The external sense signals may include, for example, signals generated by temperature transducers or the like, remaining power signals (e.g., indicating low battery power), or any other power sense signals as known to those skilled in the art. The SENSE interface 209 may also receive internal sense signals, such as from internal registers 405 or the like. The operating system of a computer system including the microprocessor 400, for example, may set one or more bits of one or more of the registers 405 to command a new power level for the microprocessor 400. The voltage interface 215 is also shown coupled to the VRM 213 via the VDDSTEP, VDDLOCK and VDD signals as previously described, where VDD is internally provided as the operating voltage to the core logic 206.

The power management system 200/300 responds to changes in power conditions by modifying the frequency of the CORE CLOCK signal and the voltage of VDD as previously described. The system 200 enables switching between a programmed frequency and the maximum frequency and the system 300 enables switching between any two programmed frequencies.

Figure 5:
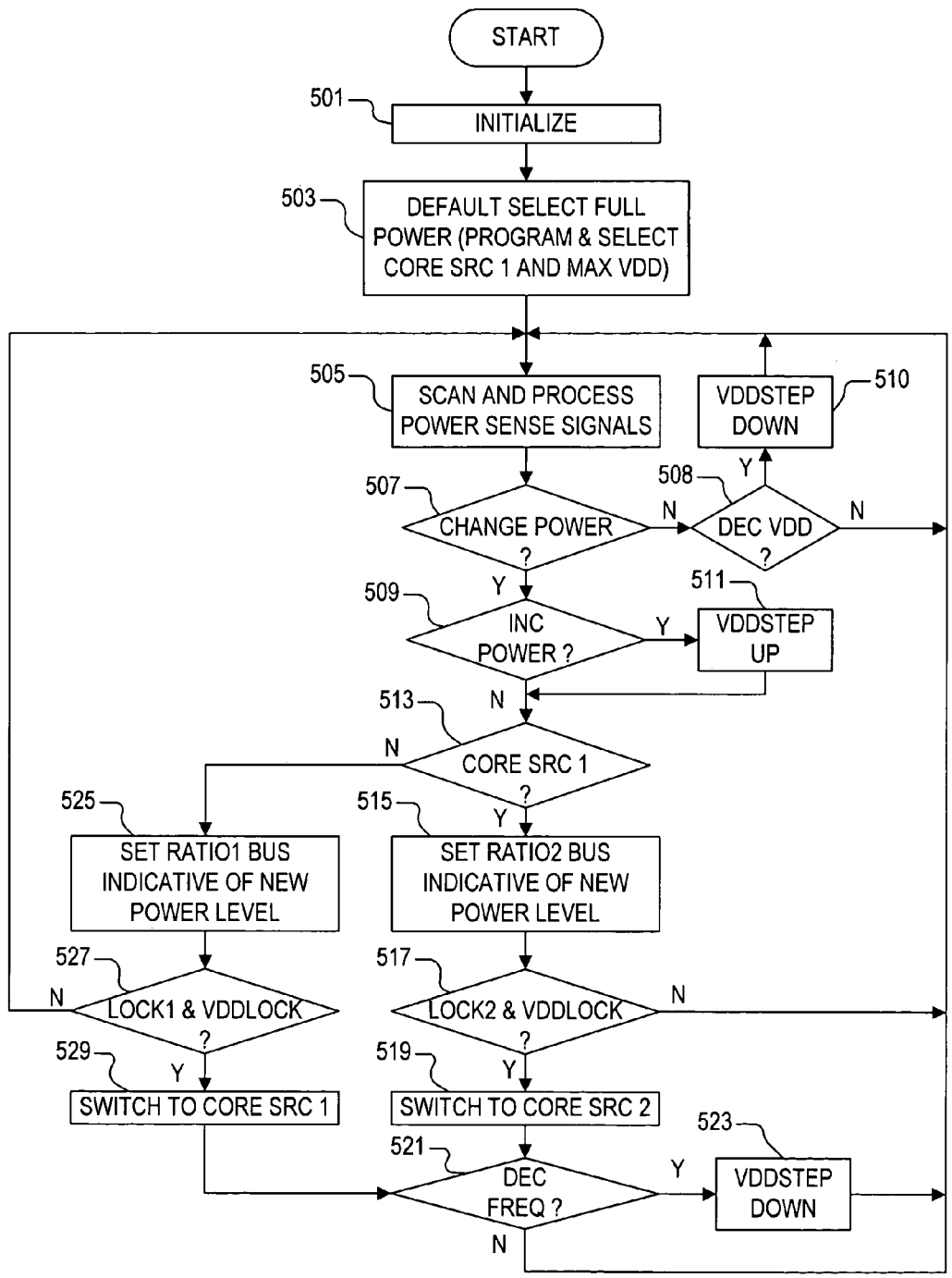
FIG. 5 is a flowchart diagram illustrating exemplary operation of the power management system of FIG. 3 according to an embodiment of the present invention.

FIG. 5 is a flowchart diagram illustrating exemplary operation of the power management system 300 according to an embodiment of the present invention. Operation of the power management system 200 is similar and somewhat simplified as described below. At first block 501 the power management system 300 is initialized. At next block 503, the clock ratio control logic 207 sets the value of the RATIO1 bus and selects the CORE SRC 1 signal as the CORE CLOCK signal as an initial default for full power mode. Also at block 503, the voltage control logic 211 asserts VDDSTEP to select VDD to be the maximum operating voltage as default for full power mode. At next block 505, the power sense signals received via the SENSE interface 209 are scanned to determine whether a new and different power level is indicated. Operation proceeds to query block 507 in which it is determined whether the power level should be changed based on the processing at block 505. If the current power level is appropriate, then operation proceeds to query block 508 to determine whether to reduce VDD and if so, to block 510 in which VDDSTEP is changed or decreased to reduce VDD. As described below, VDD may be increased in anticipation of increasing the frequency for increased power, but if the power situation changes so that the increased power level is no longer needed, then block 510 is provided to reduce VDD back to the appropriate level. From either blocks 508 or 510, operation loops back to block 505 and operation loops between blocks 505, 507 and 508 as long as the current power level is appropriate.

If a new power level is needed as determined at block 507, then operation proceeds instead to query block 509 to determine whether the power is to be increased from the current level. If power is at a reduced level and is to be increased, then operation proceeds to block 511 in which the VDDSTEP signal is changed or increased to increase the VDD voltage level appropriate for the new power level. After the VDDSTEP signal is asserted at block 511, or if power is not being increased as determined at block 509 (i.e., power is being decreased), operation proceeds to query block 513 to determine if the CORE SRC 1 signal is currently selected. If the CORE SRC 1 signal is currently selected as determined at block 513, then operation proceeds to block 515 in which the clock ratio control logic 207 sets the value of the RATIO2 bus to the appropriate level to program the PLL 203 to a new frequency level. Operation proceeds to next query block 517 in which it is determined whether the LOCK2 and the VDDLOCK signals have both been asserted by the PLL 203 and the VRM 213, respectively. Since it may take several CORE CLOCK cycles for the PLL 203 to lock to the new frequency, the LOCK2 signal is usually not asserted immediately. If the VDDSTEP signal was not changed at block 511, then VDD is presumably stable and the VDDLOCK signal is already asserted. If the VDDSTEP signal was changed at block 511, then the VDDLOCK signal may not yet be asserted at this time. It is desired to wait until the VDDLOCK signal is asserted before increasing the frequency of the CORE CLOCK signal to effectuate an increase in power level.

Rather than wait for the VDDLOCK and LOCK2 signals, operation loops back to block 505 to rescan and process the power sense signals. While it is still desired to change to the new power level, operation loops between blocks 505, 507, 509, 513, 515, and 517 until the LOCK2 and VDDLOCK signals are both asserted. If and when both LOCK2 and VDDLOCK signals are detected asserted at block 517, operation proceeds to block 519 in which the clock ratio control logic 207 switches to select the CORE SRC 2 signal as the CORE CLOCK signal. Operation then proceeds to query block 521 to determine if the frequency level was decreased. If the frequency level was decreased, then operation proceeds to block 523 in which the voltage control logic 211 changes the VDDSTEP signal to reduce VDD to the appropriate level for the new frequency level of the CORE CLOCK signal. After the VDDSTEP signal is changed at block 523, or if the frequency was not decreased as determined at block 521, operation loops back to block 505.

Referring back to block 513, if the CORE SRC 1 signal is not currently selected, then operation proceeds instead to block 525 in which the clock ratio control logic 207 set the value of the RATIO1 bus to the appropriate level to program the PLL 301 to a new frequency level. Operation proceeds to next query block 527 in which it is determined whether the LOCK1 and the VDDLOCK signals have both been asserted by the PLL 301 and the VRM 213, respectively. Since it may take several CORE CLOCK cycles for the PLL 301 to lock to the new frequency, or for the VDD signal to change if it is being increased, operation initially loops back to block 505. Rather than wait for the VDDLOCK and LOCK1 signals, operation loops back to block 505 to rescan and process the power sense signals in a similar manner as previously described. While it is still desired to change to the new power level, operation loops between blocks 505, 507, 509, 513, 525 and 527 until the LOCK1 and VDDLOCK signals are both asserted. If and when both LOCK1 and VDDLOCK signals are detected asserted at block 527, operation proceeds to block 529 in which the clock ratio control logic 207 switches to select the CORE SRC 1 signal as the CORE CLOCK signal. Operation then proceeds to query block 521 to determine if the frequency level was decreased, as previously described, to determine whether to change the VDD signal at block 523.

It is noted that the currently selected CORE SRC 1 or CORE SRC 2 signal remains selected if a new power level is indicated (at block 507) and while the PLL 203 or 301 is ramping up or down to the new frequency level. The clock ratio control logic 207 switches the CORE CLOCK signal only after the ramping PLL is locked onto the new frequency level, VDD is locked, and as long as the new power level is still valid. Note, for example, that if the PLL 301 is selected and the PLL 203 is ramping to achieve a different power level and then a different power is suddenly needed, as detected at block 505 in the loop while waiting for assertion of LOCK2, then block 507 determines whether the current power level matches the new power level. If so, operation loops between blocks 505, 507 and 508. As previously noted, if the VDDSTEP signal was changed to increase VDD at block 511 and then, prior to VDDLOCK being asserted, it is determined at block 507 that the current power level is once again valid, then block 510 provides for reducing VDD back to the appropriate level for the current frequency of the CORE CLOCK signal.

The flowchart is simplified for the power management system 200 in that block 525 is not necessary and operation proceeds directly to block 527. Also, only the VDDLOCK signal is examined at block 527 since the PLL 201 remains synchronized at the maximum frequency for maximum power. Furthermore, after switching at block 529, operation may proceed directly back to block 505 from block 527 since VDD is switched back to the maximum power level once VDDLOCK is asserted and it is not necessary to reduce VDD. For the system 200, only the PLL 203 is programmed to select a reduced power mode and the PLL 201 is temporarily selected while the PLL 203 is ramping to a new frequency level to effectuate the new power level.

In any of the scenarios presented, switching occurs instantaneously so that the microprocessor 400 is not suspended at any time. In this manner, the user benefits from low power modes without experiencing system suspension or apparent application lock-up.

Although the present invention has been described in considerable detail with reference to certain preferred versions thereof, other versions and variations are possible and contemplated. For example, although the present invention is illustrated for use with microprocessors, other circuit devices are contemplated. Also, the power management controller may be implemented externally for controlling multiple devices. Finally, those skilled in the art should appreciate that they can readily use the disclosed conception and specific embodiments as a basis for designing or modifying other structures for providing out the same purposes of the present invention without departing from the spirit and scope of the invention as defined by the appended claims.

The invention claimed is:

1. A frequency-voltage mechanism for power management, comprising:
   a first PLL that generates a first source clock signal at a first frequency based on a bus clock signal;
   a second PLL that generates a second source clock signal at a second frequency based on a first frequency control signal and said bus clock signal, wherein said second PLL generates a first frequency lock signal when said second source clock signal achieves a reduced frequency indicated by said first frequency control signal;
   select logic that selects between said first and second source clock signals to provide a core clock signal based on a select signal;
   clock control logic that detects power conditions via at least one power sense signal, that provides said first frequency control signal according to said power conditions, and that provides said select signal, wherein said clock control logic controls said select signal to switch said core clock signal from said first PLL to said second PLL in response to said first frequency lock signal; and
   voltage control logic, coupled to said clock control logic, that adjusts operating voltage commensurate with frequency of said core clock signal.

2. The frequency-voltage mechanism of claim 1, wherein said select logic switches said core clock signal via said select signal within one clock cycle of said bus clock signal.

3. The frequency-voltage mechanism of claim 1, wherein said voltage control logic reduces said operating voltage after said core clock signal is switched.

4. The frequency-voltage mechanism of claim 1, wherein said voltage control logic increases said operating voltage in response to increase power conditions, and wherein said clock control logic switches to said first PLL after said operating voltage is increased.

5. The frequency-voltage mechanism of claim 4, further comprising:
   said voltage control logic asserting a voltage step signal to adjust voltage; and
   a power supply that adjusts said operating voltage based on said voltage step signal and that provides a voltage lock signal indicative thereof to said clock control logic.

6. The frequency-voltage mechanism of claim 1, wherein said first PLL generates said first clock source signal based on a second frequency control signal and that asserts a second lock signal indicative thereof, and wherein said clock control logic provides said second frequency control signal and receives said second lock signal.

7. The frequency-voltage mechanism of claim 1, wherein said clock control logic and said voltage control logic cooperate to increase said operating voltage prior to increasing frequency of said core clock signal and to decrease said operating voltage after decreasing frequency of said core clock signal.

8. A microprocessor, comprising:
   a power condition sense interface receiving at least one power sense signal indicative of power conditions;
   an operating voltage interface;
   a first PLL that generates a first source signal at a frequency based on a bus clock signal and a first core ratio bus value and that provides a corresponding first lock signal;
   a second PLL that generates a second source signal at a frequency based on said bus clock signal wherein said second PLL generates said second source signal at a maximum power frequency level;
   a clock controller, coupled to said power condition sense interface and said first and second PLLs, that provides a select signal for switching between said first and second PLLs, that provides said first core ratio bus value to control frequency of said first source signal and that receives said corresponding first lock signal;
   select logic that selects between said first and second PLLs based on said select signal to provide a core clock signal; and
   a voltage controller, coupled to said clock controller and said operating voltage interface, that adjusts operating voltage commensurate with frequency of said core clock signal;
   wherein said clock controller initially selects said second PLL, determines a reduced power level sufficient to meet said power conditions, provides said first core ratio bus value indicative of a reduced frequency of said core clock signal to achieve said reduced power level, and switches said select signal to select said first PLL in response to receiving said first lock signal;
   wherein said first PLL ramps said first source signal to said reduced frequency and provides said first lock signal indicative thereof; and
   wherein said voltage controller reduces operating voltage commensurate with said reduced frequency after said clock controller switches said core clock signal.

9. The microprocessor of claim 8, wherein:
   said voltage controller detects an increased power level sufficient to meet said power conditions and increases operating voltage; and
   wherein said clock controller switches said select signal to select said first PLL after operating voltage is increased.

10. The microprocessor of claim 8, further comprising:
    said second PLL generating said second source signal at a frequency based on said bus clock signal and a second core ratio bus value and that provides a second lock signal indicative thereof; and said clock controller providing said second core ratio bus value to control frequency of said second source signal and receiving said corresponding first lock signal.

11. The microprocessor of claim 10, wherein said clock controller and said voltage controller cooperate to decrease operating voltage after decreasing frequency of said core clock signal and to increase operating voltage before increasing frequency of said core clock signal.

12. A method of frequency-voltage control for microprocessor power management, comprising:

generating a first source clock at a first frequency based on a bus clock signal and a first ratio bus value;

generating a second source clock at a second frequency based on the bus clock signal and a second ratio bus value;

sensing power conditions;

switching core operating frequency between the first and second source clock signals based on sensed power conditions;

selecting operating voltage commensurate with the core operating frequency, initially selecting the first source clock signal;

providing the second ratio bus value based on reduced power conditions to indicate a reduced frequency;

ramping the second source clock signal to the reduced frequency in response to the second ratio bus value;

detecting a first lock indication when the second source clock signal achieves the reduced frequency;

switching to the second source clock signal when the lock indication is detected; and reducing operating voltage commensurate with the reduced frequency after said switching.

13. The method of claim 12, wherein said switching to the second source clock signal comprises switching within one bus clock cycle.

14. The method of claim 12, further comprising:

sensing increased power conditions;

increasing operating voltage commensurate with the sensed power conditions; and switching to the first source clock signal.

15. The method of claim 14, prior to said switching to the first source clock signal, further comprising:

determining an increased power level appropriate for the increased power conditions;

providing the first ratio bus value indicative of an increased frequency based on the increased power level;

ramping the first source clock signal to the increased frequency;

said increasing operating voltage comprising increasing operating voltage commensurate with the increased frequency; and detecting a second lock indication when the first source clock signal achieves the increased frequency.

16. The method of claim 14, wherein said switching to the first source clock signal comprises switching within one bus clock cycle.

* * * * *